United States Patent

Rao et al.

[11] Patent Number: 5,943,477
[45] Date of Patent: Aug. 24, 1999

[54] MICROLOCAL CALIBRATION OF DIGITAL PRINTERS

[75] Inventors: Ravishankar Rao, White Plains; Gerhard Robert Thompson, Wappingers Falls; Charles P. Tresser, Mamaroneck; Chai Wah Wu, Ossining, all of N.Y.

[73] Assignee: International Business Machines Corporation, Armonk, N.Y.

[21] Appl. No.: 09/085,094

[22] Filed: May 26, 1998

[51] Int. Cl.$^6$ .............................. G06F 15/00; H04N 1/46
[52] U.S. Cl. .............................. 395/108; 358/502
[58] Field of Search ...................... 395/108, 103, 395/104, 107, 111; 358/401, 471, 501, 502, 503, 459, 466

[56] References Cited

U.S. PATENT DOCUMENTS

5,233,366  8/1993  Stephany ................................ 346/1.1
5,648,801  7/1997  Beardsley et al. ..................... 347/15

*Primary Examiner*—Jerome Grant, II
*Attorney, Agent, or Firm*—Whitham, Curtis & Whitham; Stephen C. Kaufman

[57] ABSTRACT

A method and apparatus to calibrate a printer which do not depend on geometric assumptions on the printed dots. The method takes account of the fundamentally probabilistic nature of the process of printing any dot on some types of printers such as laser printers. It allows estimating the probability distribution of what gets printed at each pixel depending on the local configuration of dots to be printed in such a way that only a limited number of tests need to be done, while no artificial cutoff is introduced on the size of local configurations to be taken into account. The calibration method can be applied to many problems encountered in digital printing, and permits computing printer dependent calibration of a dithering method without need for further direct measurements.

8 Claims, 8 Drawing Sheets

MICROLOCAL CALIBRATION OF DIGITAL PRINTERS

BACKGROUND OF THE INVENTION

1. Field of the Invention

The present invention generally relates to the calibration of digital printers, such as laser and ink jet printers, and, more particularly, to a method and apparatus for calibrating a printer, which method and apparatus do not depend on geometric assumptions on the printed dots.

2. Background Description

Most printers today can print in only a limited number of colors. Digital halftoning is a technique for printing a picture (or more generally displaying it on some two-dimensional medium) using small dots with a limited number of colors such that it appears to consist of many colors when viewed from a proper distance. For example, a picture of black and white dots can appear to contain grey levels when viewed from some distance. In fact the rest of the discussion will be restricted to the case of grayscale images and their rendering by black and white printers to facilitate the presentation. Anyone versed in the art of digital halftoning should know how to adapt the present invention to color images. When we speak of ink, it could mean any material and/or mechanism which produces the black in the image, i.e., it could be toner for a xerographic printer, ink for an inkjet printer, etc.

We will be concerned with bilevel, fixed pixel size printers (for instance laser printers). Such printers have two fundamental characteristics:

1) The print resolution, say d dpi (dots per inch), which can be interpreted as saying that the intended fundamental units of the print are arranged on a grid of squares with each square or pixel of size 1/d inches by 1/d inches, where d typically varies from about 300 to about 3000. In some cases, the pixels lie on a rectangular grid, but the discussion adapts equally well to this case, so we will always assume square pixels for definiteness.

2) The dot gain which tells us how the actual printed pixel (or dot) differs from a perfect 1/d by 1/d square in shape and size (notice that in previous sentences, the word "dot" was used in a loose sense). While many printers perform differently, standard theory and much of the prior art on calibration assumes that printers print dots which can be reasonably described as round, say with diameter D (or as an ellipse in the case of a rectangular grid), and the dot gain is often described accordingly.

In the sequel, we make the assumption that no printed dot goes beyond a circle with diameter 2/d centered at the middle of the pixel where it is intended to be printed (a circular dot which covers an entire 1/d by 1/d square has diameter at least $\sqrt{2}/d$). This assumption is made to simplify the discussion and in particular the description of the invention. Adaptation to a more general case is tedious to describe but not difficult to implement by anyone skilled in the art of digital printing.

In this invention, we are not concerned with modeling the properties of light, ink, paper and eye interactions. Such work has been done by Neugebauer, Murray-Davies, Yule-Nielsen, Clapper-Yule, BeerBouguer, Kubelka-Munk, and others as described in Henry Kang's book, *Color Technology for Electronic Imaging Devices*, SPIE Optical Engineering Press, 1997, which is incorporated herein by reference in its entirety. However, none of these models is concerned with the effect of neighboring pixels on the amount of ink deposited at a given pixel, which is the central contribution of the present invention. If the measurement tools which are used to implement the present invention measure the coverage of the ink on paper, these previous theories can be used to obtain the corresponding human visual response. Some other tools directly measure the human visual response, in which case the measurements can be used directly.

Consider now some grayscale image to be printed with a digital printer. We assume that the image is of size h by v, where h and v are expressed in inches to be consistent with the unit used in the dpi description. It is then convenient to interpret this image as a matrix I of size H=h×d by V=v×d in the following way:

One thinks of the image as covered by little squares of size 1d by 1/d (also called pixels).

Then each pixel p can be designated by its horizontal ordering number i (say from left to right) and its vertical ordering number j (say from top to bottom). Thus, the location of p is specified by the pair (i,j).

To the pixel at (i,j) one assigns the value g between "0" and "1", where "0" corresponds to white, "1" corresponds to black, and more generally, g corresponds to the grey level of this particular pixel.

The matrix I is then defined by setting $I_{(i,j)}=g$.

Given a matrix such as I, a digital halftoning algorithm will associate to it a H by V halftone matrix M whose entries $M_{(i,j)}$, are either "0" or "1". Now "0" means that no dot will be printed by the digital printer at pixel (i,j), while a "1" means that a dot is to be printed.

It is clear that the implementation of any halftoning algorithm has to take the dot gain into account; but more has to be said. The fact is that, besides dot gain, one of the problems to be solved by a digital halftoning method is that some types of printers do not necessarily print a dot at (i,j) each time $M_{(i,j)}=1$. In particular, this is the case for laser printers. Usually, the likelihood of a dot being printed at (i,j) when $M_{(i,j)}=1$ depends on whether nearby dots also have to be printed. The same physical mechanism which causes the unpredictability of a dot being printed usually also causes the shape of dots to depend on whether nearby dots are to be printed or not. In other words, the effective dot covering is not constant (and usually can vary from the classical printer specification in terms of dot gain). Accordingly, because of both dot gain effects and the unpredictability of printing dots intended to be printed, the dots may not exactly cover the corresponding pixels. Most often, they overlap portions of neighboring pixels (see FIG. 1B), or may just not cover anything. Clearly, some account has to be taken of this discrepancy.

There are currently two main ways to take account of the effective dot covering:

either one includes a model for the dots in the digital halftoning algorithm like that disclosed in U.S. Pat. No. 5,473,439 to Pappas and Neuhoff, in which case the calibration of a printer amounts to getting some parameters of the model such as the radius of the dots for round dot models, or one conceives the algorithm for perfect square dots and then adapts it to any printer using some pure calibration method.

In some sense, the model based methods are microscopic in nature, but make strong, often unrealistic, assumptions about the printers to which one may apply them. The pure calibration methods are more empirical than the model based methods but have the disadvantage that they require testing each time one tries to implement a new algorithm. In fact, using prior art, preliminary calibration should precede any field test of any new algorithm if no model based consideration is used. This is obviously time consuming and one of the merits of the invention disclosed here is to avoid this loss of time, while using a more realistic model than in simple model-based techniques such as in U.S. Pat. No. 5,473,439.

A good digital halftoning algorithm should make sure that the ink that is actually put down is in accordance with what you want to print. This requires a proper method to calibrate, and we provide such a method. More precisely, this invention presents a new calibration method which can be used in a variety of halftoning methods, and is devised so that it can serve as a basis for a novel model based digital halftoning algorithm while keeping most of the pragmatic flavor of pure calibration methods. In some sense, the present invention allows one to perform the calibration so that it results in a realistic model for what will be actually printed at each pixel depending on the local configuration of dots intended to be printed.

Problems to be Solved

Calibration methods from previous art make heavy use of simple printed dot models, as for instance in "MECCA—A Multiple-Error Correction Computation Algorithm for Bi-Level Image Hardcopy Reproduction", IBM Res. Rep., RZ1060 (1981) by P. Stucki, "Measurement of Printer Parameters for Model-based Halftoning", J. El. Imag., 2(3) (1993) 193–204 by T. N. Pappas, C. K. Dong, and D. l. Neuhoff, and U.S. Pat. No. 5,649,073 to Knox, Hains and Sharma. Furthermore, they fail to take explicit account of the fundamentally probabilistic nature of individual dot printing in laser and other sorts of digital printers.

In the paper "Screen design for printing", (Intl. Conf on Image Processing, Vol 2, pp 23–26, Oct. 1995), Q. Lin discusses various printer dot models. The only probabilistic model used there is a single two dimensional Gaussian probability function which depends solely on the distance to the center of the dot. The method we propose goes beyond this simplistic assumption, and is far more general. In particular, it takes into account the local configurations of dots intended to be printed.

We want to measure how pixels get covered by ink on average in any configuration of neighboring dots. Since, however, nearby dots are somewhat unpredictable, one may have to consider as well the neighbors of the neighbors, and so on. This is clearly impractical since it would mean considering far too many parameters.

This invention describes how to obtain a meaningful local understanding of the dot's characteristics which depends only on local configurations, without having to explore arbitrarily large configurations. A simple solution to the problem of the limitation of the size of the neighborhoods to be taken into account is to just declare that some neighborhood size is fully investigated and that the next bigger size plays no role. Similar solutions in the world of statistical mechanics are known to yield poor results, and we give next an example showing that such an approach is also bad for calibrating digital printers.

The simplest example is that of a pixel location (i,j) with the following configuration. We wish to print no dot at (i,j), and a single dot in the immediate neighborhood of (i,j), say at (i,j+1). If the (i,j+1) dot is isolated, it will probably not print and the expected coverage is small. If dots are to be printed at all three of the pixels (i−1,j+2), (i,j+2), and (i+1,j+2), the dot at (i,j+1) is almost surely going to be printed and is in fact expected to be rather large, inducing a substantial covering of the pixel (i,j). Thus, it does not make much sense to take precise account of the immediate neighborhood and no account at all of the next to immediate neighborhood. Examples like this could be constructed for any cutoff distance. The effects get smaller when the cutoff distance increases but will become negligible only when the number of configurations to be considered is already prohibitively large. Consequently, it is important to solve the problem of limiting the cases to be considered in a reasonable manner.

SUMMARY OF THE INVENTION

It is therefore an object of the present invention to provide a solution to this problem, allowing a calibration requiring only an accessible number of computations and not suffering from the bias of arbitrary cutoff of neighborhood size.

According to the invention, there is provided a method and apparatus to calibrate a printer, which method and apparatus do not depend on geometric assumptions on the printed dots. The method takes account of the fundamentally probabilistic nature of the process of printing any dot on some types of printers such as laser printers. It allows us to estimate the probability distribution of what gets printed at each pixel depending on the local configuration of dots to be printed in such a way that only a limited number of tests need to be done, while no artificial cutoff is introduced on the size of local configurations to be taken into account. The calibration method according to the invention can be applied to many problems encountered in digital printing, and permits computing printer dependent calibration of a dithering method without the need for further direct measurements.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 2:
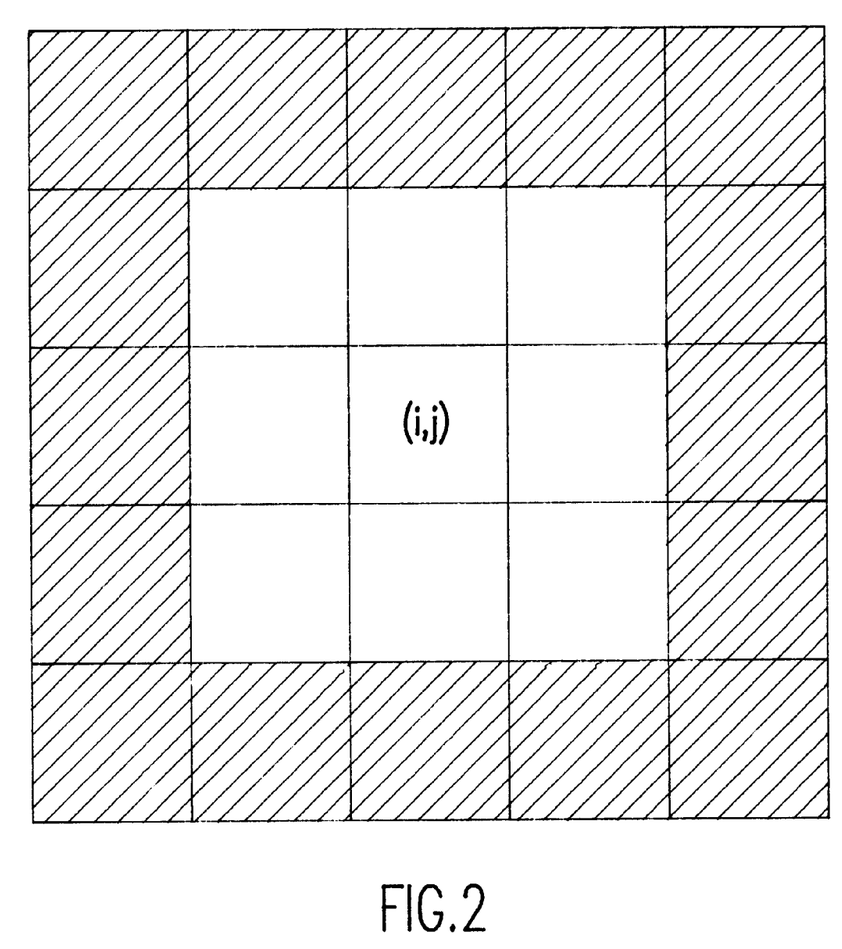
FIG. 2 is a matrix of pixels in the 1-neighborhood of a central pixel (shown in white) surrounded by pixels in the peripheral 2-neighborhood (shown in black) of the central pixel (i,j)

Let (i,j) be the location of a pixel. By the n-neighborhood of (i,j), we mean the square of side 2n+1 centered at (i,j). The pixels in the n-neighborhood of (i,j) and not in the (n−1)-neighborhood of (i,j) form the peripheral n-neighborhood of (i,j). This is illustrated in FIG. 2.

Figure 1A:
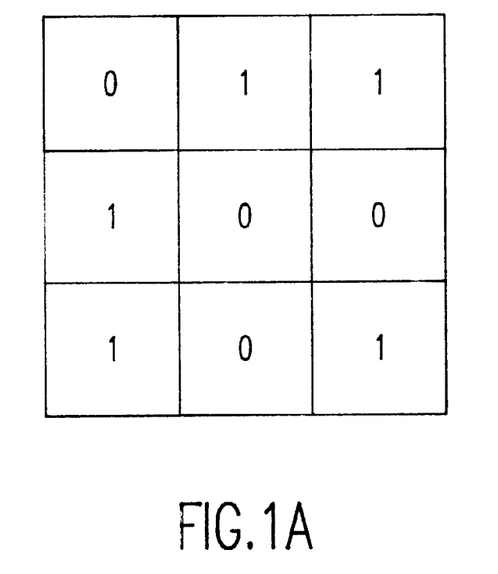
FIGS. 1A and 1B are, respectively, a matrix of pixels indicating those pixels to be printed by a "1" and the matrix showing an example of actual printing in which a subset of the central pixel is covered by ink.
Figure 1B:
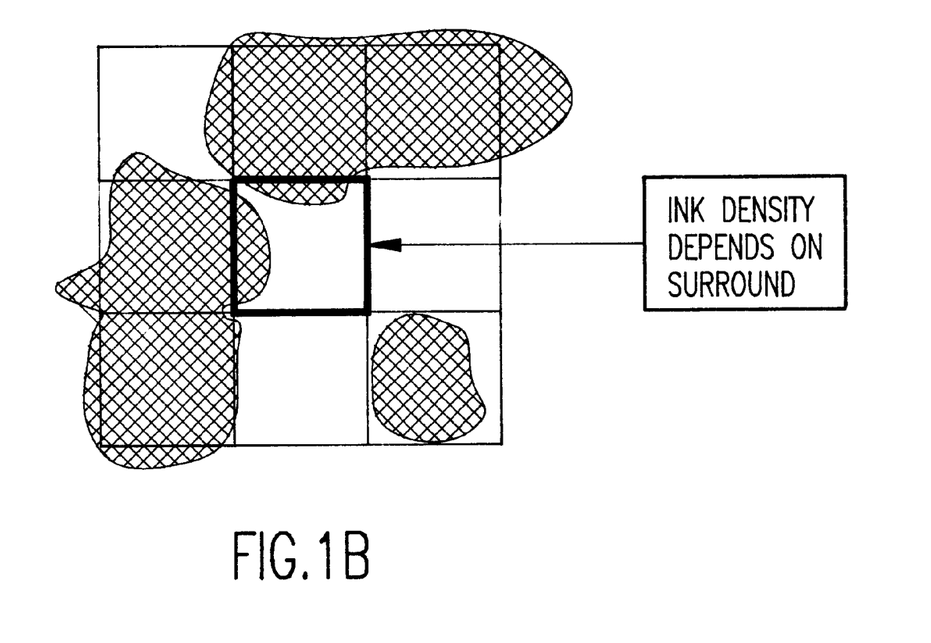
Figure 1C:
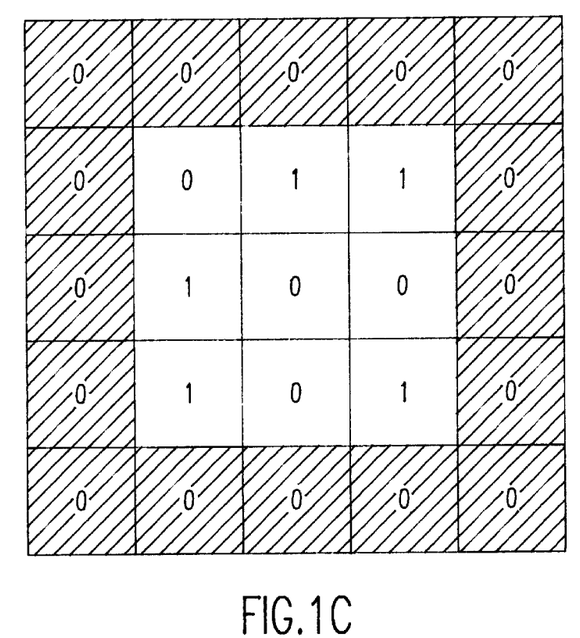
FIGS. 1C and 1D are, respectively, a matrix of pixels indicating those pixels to be printed by a "1" and the matrix showing an example of actual printing in which a subset of the central pixel is covered by ink for the case of a 2-neighborhood.
Figure 1D:
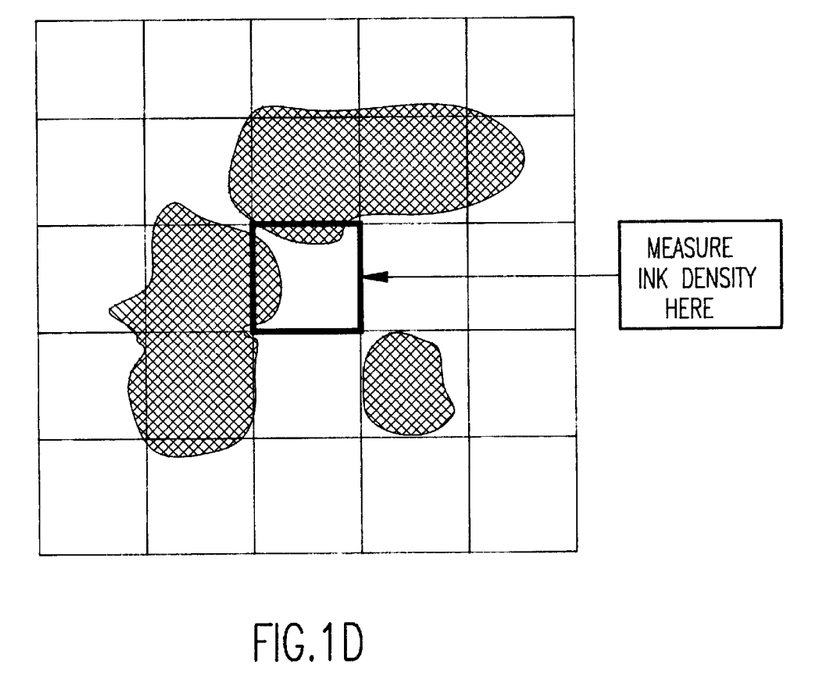
Figure 1E:
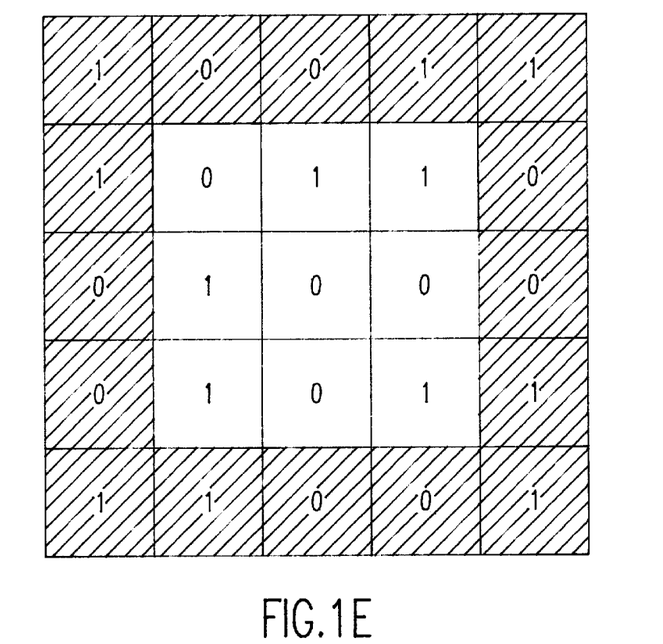
FIGS. 1E and 1F are respectively similar to FIGS. 1C and 1D except that the peripheral 2-neighborhood is all zeros in this case and, as a result, the ink coverage of the central pixel has changed due to changes in the peripheral 2-neighborhood.
Figure 1F:
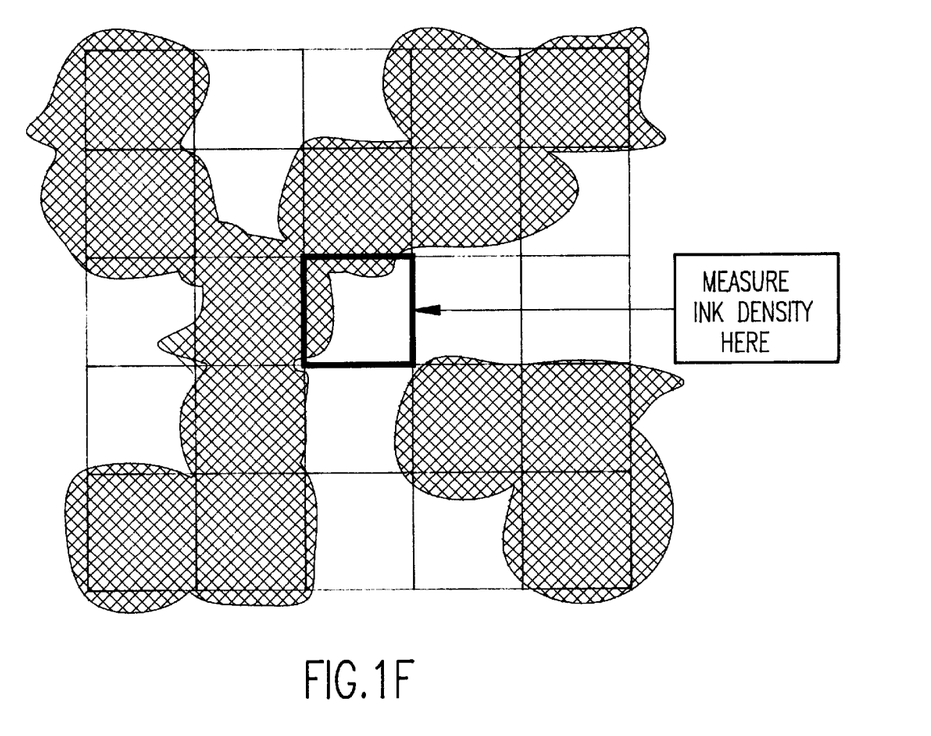

For each pixel (i,j), we need to characterize the amount of ink to be printed at that pixel. Referring again to FIGS. 1A and 1B, given a pixel configuration in the n-neighborhood of the pixel (i,j), we want to determine the amount of ink printed at pixel (i,j). In FIG. 1A, n=1, and in FIGS. 1C and 1E, n=2, but in general, n can be larger. As mentioned previously, a precise answer to this problem requires the knowledge of the full configuration of all dots to be printed, which in turn involves far too many parameters to be of practical use. For example, comparing FIG. 1C with FIG. 1E and FIG. 1D with FIG. 1F, we can see that pixels in the peripheral 2-neighborhood can affect the ink coverage in the center pixel, even though the configuration in the 1-neighborhood is the same. Furthermore, even if one tries to print the same pattern around a pixel several times with the same printer, the actual ink coverage of the center dot will vary.

As a matter of fact, most, if not all, man made machines function with some rate of failure. In many instances, the processes involved are quite stable and it is reasonable, for most practical purposes, to model the functioning of the machine as being quite faithful and thereby deterministic. This is not the case for individual dot printing in some digital printers, so that this process should rather be modeled as probabilistic (the deterministic aspects of it occur at a scale so small that they can neither be measured nor controlled).

Because of this practical lack of determinism, what is needed is a probabilistic description of the pixel coverage, depending on the surrounding pattern. It is the purpose of the present invention to disclose how to capture the probability distribution for the pixel coverage, depending on the configuration of dots intended to be printed in some n-neighborhood and taking partial account of the configuration in the peripheral (n+1)-neighborhood.

Our method consists in considering all configurations in the n-neighborhood, possibly after recognizing some classes of equivalent configurations, and averaging over random configurations in the peripheral (n+1)-neighborhood to both limit the number of computations to be performed and avoid having to consider neighborhoods of arbitrary large size without introducing an arbitrary, and a priori damaging cutoff.

The spirit of this method is close to ideas previously used for instance in turbulence and in statistical mechanics but never before in the context of printer calibration. As usual, the probability distributions gathered by our method can be modeled by some preferred probability law depending on parameters, in which case one obtains a description of the printer in terms of a function associating such parameters to local configurations.

For the sake of comparison with previous model based methods, instead of the pixel coverage, one may prefer to get a probability distribution for the shapes of the dots to be printed which depend on local configuration. Anybody versed in the art of digital halftoning should be able to adapt the present invention to dot estimation by introducing a model (say round for instance) for the shape of the dots. Thus, our method also allows one to get a configuration dependent probability distribution of the size (the radius of the circular dot for instance). However, substituting dot estimates for pixel coverage would mainly be valuable to compare with previous art, and thus has mainly a theoretical advantage.

The pixel coverage calibration method disclosed allows a simple direct computation of the statistics of the microscopic structure of the image to be printed (one just has to collect what is predicted for each pixel, and the method is set up so that the results for different pixels do not influence each other) and avoids the introduction of a shape assumption which would at best be approximately good.

These probability distributions can be used to simulate a print output for a given input image. This is a rendition of how the image would appear to the eye if it were printed on the printer which is modeled according to the current invention. The rendition can be done using two broad classes of methods: centralized and randomized. In the centralized case, we render the central pixel of a neighborhood with a fixed measure of central tendency of its probability distribution. For example, the central pixel takes on the value of the mean or median. In the randomized case, we generate a random value for the central pixel in accordance with its probability distribution. We can also use any other well known method to take account of the knowledge of a probability distribution. Whichever method is chosen will clearly depend on applications: one may chose to take the average for calibration but not for worse case a priori estimates.

Description of a Specific Implementation

Since the 1-neighborhood of (i,j) contains 9 pixels, there are $2^9=512$ different binary patterns which can be printed in the peripheral 1-neighborhood of (i,j). Similarly, there are 65,536 binary patterns for the peripheral 2-neighborhood, thus $33,554,432=512\times65,536$ configurations in the 2-neighborhood, which can be considered too much to examine.

Before dealing with the main problem of taking partial account of the peripheral 2-neighborhood, we first describe how simple symmetry considerations allow one to reduce the number of cases to be considered. To this end, we notice that, assuming symmetry around (i,j) by rotations of multiples of 90 degrees, and mirror symmetries about (i,j), we can reduce the number of configurations in the peripheral 1-neighborhood to 102. These are called the basic configurations. For some printers, the reduction from 512 to 102, which depends on invariance by rotations by multiples of 90 degrees and symmetries, might not be satisfactory. For definiteness, we will assume the reduction of up to 102 basic configurations has been made. If the assumptions of symmetry do not hold, we can readily examine all the 512 configurations.

After the reduction to basic configurations in the 1-neighborhood, there are still many thousands of configurations in the peripheral 2-neighborhood, and 102 times many thousands is still too big a number of patterns to examine. Note that if technology progresses so as to make such numbers easily accessible, this invention, which allows one to avoid cutoff on the size of the neighborhoods to be considered, will allow one to increase the size of the examination by an obvious adaptation.

To reach smaller numbers, we use the fact that there can be only k=0 to k=16 black dots printed in the peripheral 2-neighborhood. For each of the seventeen values 0,1,2, . . . ,16 of k, there are several configurations. We choose at random some number $N_k$ of them (for instance $N_k$ can be chosen to be less than 20): these configurations in the peripheral 2-neighborhood are the external configurations. We can assume that the printer characteristics are reasonably uniform over the page, so that the absolute location of a pixel is not important in determining the characteristic of the printed dot. Rather, the immediate or relative neighborhood is important. Therefore, the actual value of i and j can be ignored, so that no dependence on (i,j) is assumed in the sequel. Accordingly, the pair (i,j) will be considered as fixed until otherwise specified, the location (i,j) being meanwhile called the center.

For each basic configuration C and for each k there corresponds $N_k$ test configurations, obtained by surrounding the basic configuration C with each of the $N_k$ external configurations that we have chosen.

What we seek is the probability distribution of the ink coverage at the center for each pair (C, k) formed by the basic configuration C and a number k of dots to be printed in the peripheral 2-neighborhood of the center. There are for example 17×102=1,734 such pairs. To get the probability distribution for each of the 1,734 pairs of (C,k), we print the $N_k$ test configuration corresponding to (C,k) many times along with registration marks, and measure the ink coverage at the center pixel of the configuration. The registration marks are used to align the print and determine the location of the center pixel of each configuration. The measurement can be done using some measuring apparatus such as a fine densitometer or a high resolution scanner (other kinds of measuring devices can be used as well without changing the nature nor the spirit of the method). An example of such a high resolution scanner is the TS 3100 scanner made by TECSA Limited of Norfolk, England, which is capable of scanning at up to 2540 dpi optical resolution. A printout made by a 600 dpi printer and scanned at 2400 dpi would get 2400×2400/(600×600)=16 samples per printed dot.

Figure 3:
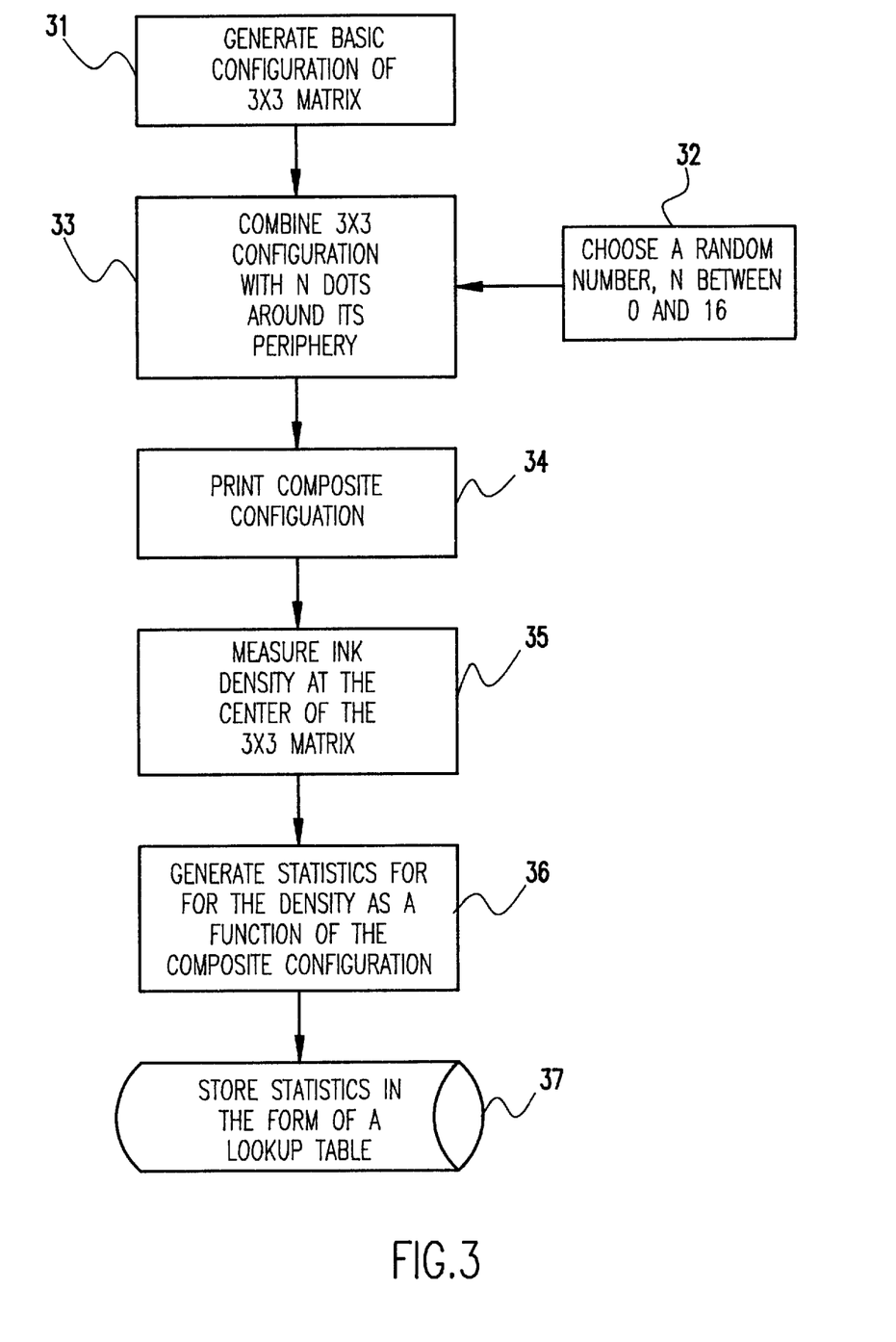
FIG. 3 is a flow diagram showing the process according to the invention of generating statistics for the ink density as a function of the composite configuration.

FIG. 3 illustrates this procedure. More specifically, the basic configuration of a 3×3 matrix is generated as an input in block 31, and a random number N between 0 and 16 as an input in block 32. The 3×3 configuration is combined with N dots randomly chosen around its periphery in function block 33. A composite configuration is printed in block 34, and the ink density is measured at the center of the 3×3 matrix in block 35. Then, based on this measurement, statistics for the ink density as a function of the composite configuration are generated in block 36. The statistics are stored in the form of a lookup table in output block 36.

One may obtain the probability distribution for (C,k) as given by the experimentally determined histogram. The probability distribution can also be modeled (for instance as a Gaussian distribution), and can then be described by a set of numbers (for instance the mean and variance) which completely (in the case of a Gaussian), or most conveniently (in general) describe the distribution. We will assume the distribution is modeled by a Gaussian in the rest of the disclosure, for the sake of clarity.

Under the Guassian hypothesis, to each pair (C,k) formed by a basic configuration C and a number k of dots intended to be printed in the peripheral 2-neighborhood. We can then associate a pair (m(C,k),s(C,k)) where m(C,k) is the mean of the Gaussian distribution for (C,k), and s(C,k) is the variance of the Gaussian distribution for (C,k). Thus, under the Gaussian hypothesis, the full calibration results in a table of 102×17=1,734 entries, each entry consisting of a pair formed of a mean and a variance. As we mentioned previously, the reduction to basic configurations might be unreasonable, in which case, 102 has to be replaced by 512 in the above computation.

Notice that the calibration is obviously paper dependent, as is always the case. Also notice that the method can be implemented as well for other two-dimensional displays such as screens where usually the probabilistic aspects are negligible (the variance is zero). However, the rest of the method of the computation of the (C,k)-dependent pixel contributions applies in a similar way.

The calibration we have described allows one to predict the amount of ink that any matrix M will generate at each pixel (i,j): one just has to consider successively each pair (i,j) as the center and inspect the matrix M to find C and k for each (i,j). Thus, our method can be used to adapt any dithering mask to a printer. For example, for each gray level g, we generate a uniform image of gray level g. The dither mask generates a halftone matrix M for this image and the use of the calibration described in this disclosure can then be used to predict the actual amount of ink that is printed. This in effect generates the calibration curve or tone reproduction curve for the dithering mask. Other halftoning methods can also be calibrated using this table of probability distributions. Because this method allows one to predict the microscopic structure of the print corresponding to any matrix M, the full calibration operation can be done once and for all and then be used for several purposes and halftoning methods without having to measure printouts each time. In the case of printers which have time cycles, such as linked to toner cartridge usage level, our calibration method will be used at various stages of the cycle, and these data will be used to adapt, for instance a dithering mask calibration, to each stage in the cycle.

Figure 4:
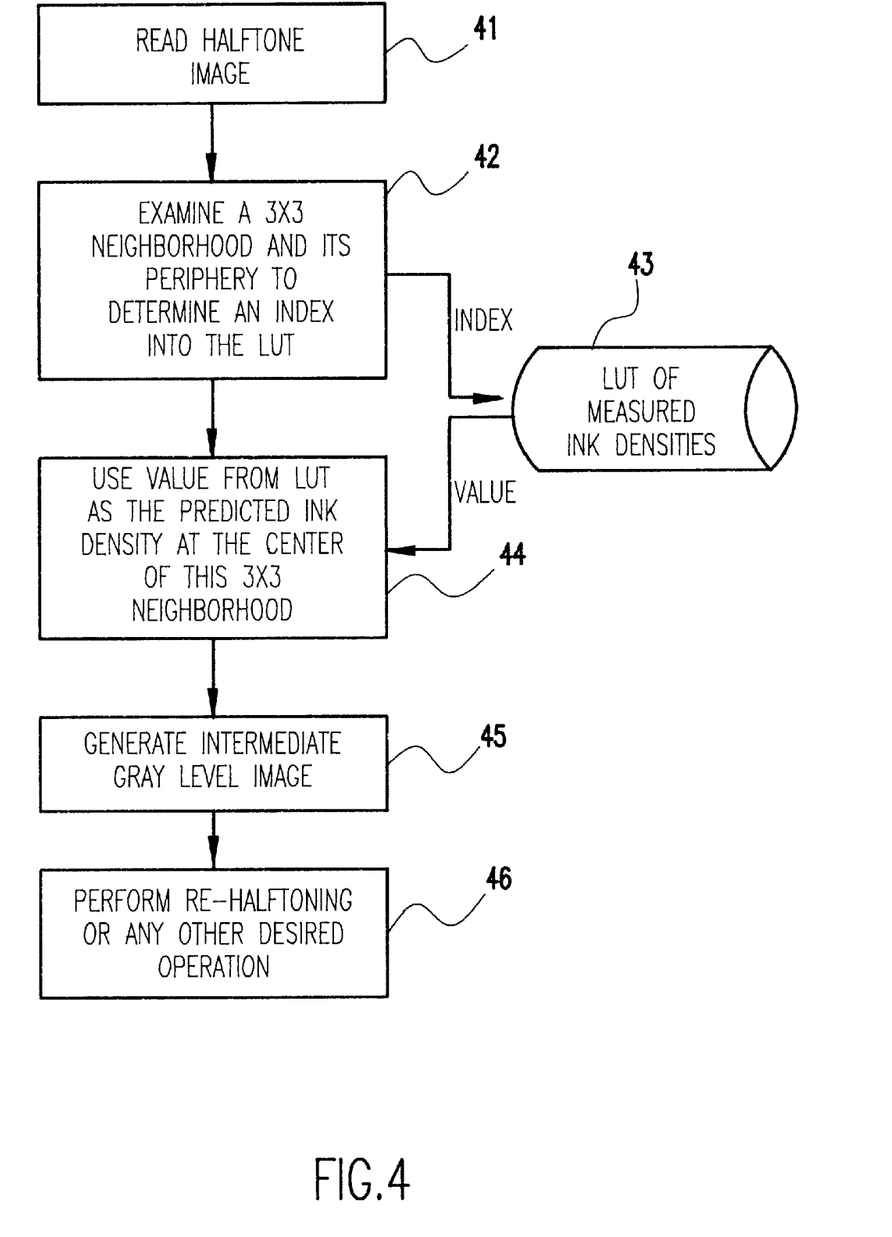
FIG. 4 is a flow diagram of the process according to the invention of printing a halftone image.

FIG. 4 illustrates the use of the printer model in the form of a lookup table. This case is specifically shown for monochrome images, but can easily be extended for color images. The input halftone image is read in input block 41, and successive 3×3 neighborhoods along with their peripheries are considered in function block 42. Each such neighborhood can be mapped into an index, ranging from 1 to the maximum number of configurations that were measured. The lookup table entry 43 at this index specifies the density of ink that the paper will contain at the center of this 3×3 neighborhood in function block 44. The operations of index generation and lookup are performed over the extent of the input image to generate an intermediate gray level image in function block 45. This gray level image is a simulation of what the printed output would look like if actually printed on the original printer. The gray level image is then processed (e.g., contrast enhanced, if desired) and re-halftoned to be printed on the desired printer in function block 46.

For color printers, the method according to the invention is used independently for each color ink. The calibration model for each color has to take into account any previously deposited inks if needed. Again, care has to be taken in considering the interaction of color inks, light and paper on the visual human response.

Figure 5:
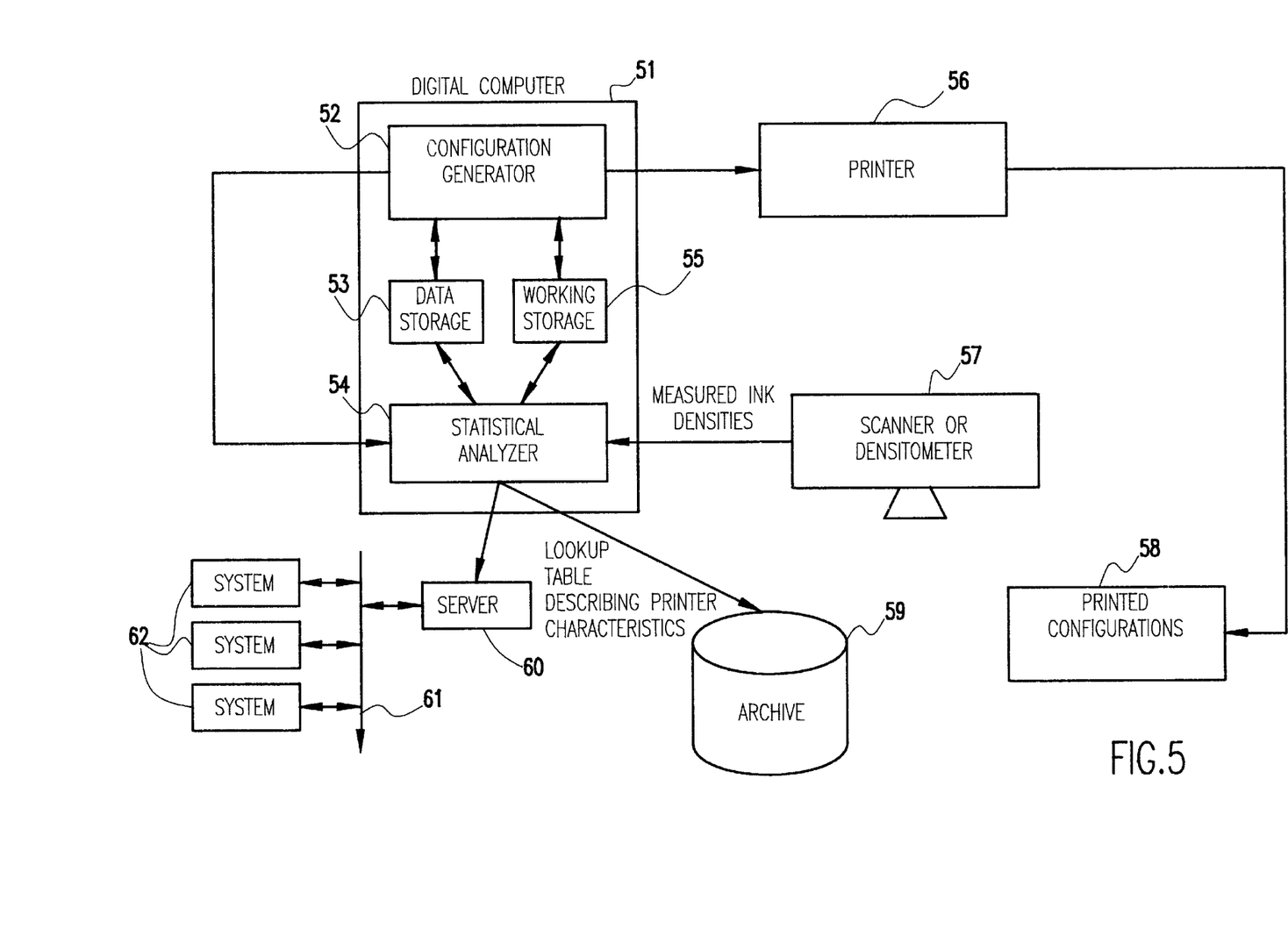
FIG. 5 is a block diagram of a typical system embodiment for obtaining the printer characteristic.

FIG. 5 shows a block diagram of a typical system embodiment for obtaining the printer characteristics of a printer P. It includes a digital computer 51 such as an IBM RISC System/6000 system, the printer P 56, a densitometer or high resolution scanner 57, and external storage 59. The configuration generating component 52 of the digital computer 51 generates a set of configurations which is sent to the printer 56. Printer 56 prints these configurations resulting in the physical media 58. The ink densities on the physical media 58 are measured by scanner 57. The resulting measured ink densities are sent to the statistical analyzer component 54 of computer 51 to obtain a lookup table describing the ink density depending on the local printed configuration. The computer 51 also contains internal data storage 53 and working storage 55 for temporary storage. The lookup table are stored in the external (nonvolatile) archive 59, or sent to a server 60 which could be connected to the network 61. The network 61 is interconnected with a Local Area Network (LAN), a Wide Area Network (WAN) such as the Internet, or both. In this case many systems 62 are connected to the network 61 which can also access the lookup table.

Figure 6:
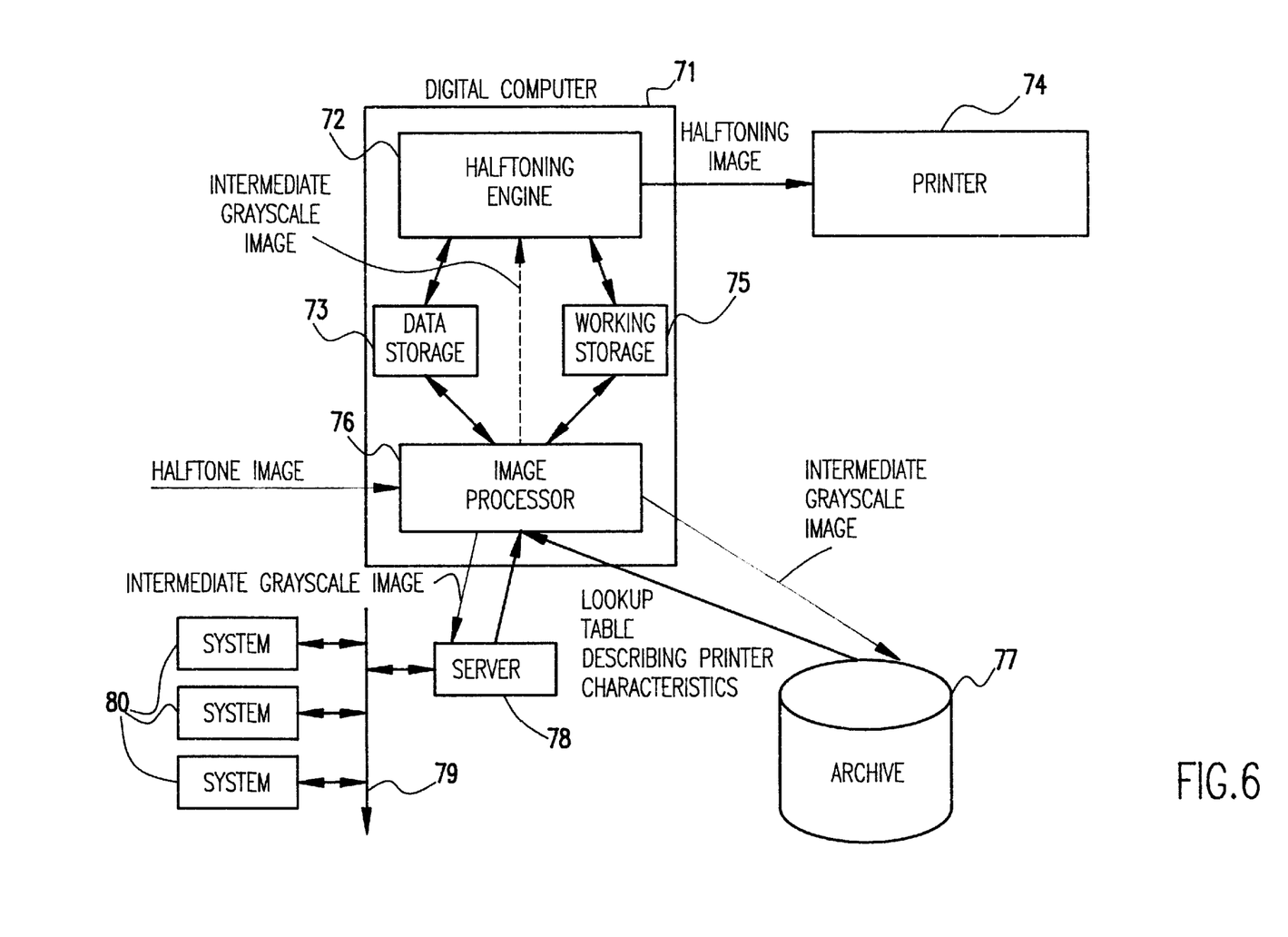
FIG. 6 is a block diagram of a typical system embodiment of a printing system utilizing the lookup table generated by the system of FIG. 5.

FIG. 6 shows a block diagram of a typical system embodiment of a printing system utilizing the lookup table generated by the system in FIG. 5. A halftone image is input into the digital computer 71. Digital computer 71 includes an image processing component 76 which takes this halftone image and retrieves the lookup table from either external storage 77 or server 78. The server 78 could be connected to a network 79 which itself is in turn connected to many computer systems 80. Using the lookup table, the image processor 76 converts the halftone image into an intermediate grayscale image. This intermediate grayscale image can be halftoned again by halftone engine 72 using some halftoning method. This results in a halftone image which is sent to printer 74. The intermediate grayscale image can also be sent to external archive 77 or server 78. The halftone engine 72 and image processor 76 have access to internal data storage 73 and working storage 75.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for calibrating a printer by capturing the characteristics of a printer so as to predict the ink coverage induced by a halftone matrix at each pixel, comprising the steps of:

generating a basic configuration matrix and choosing a random number N;

combining the configuration matrix with N dots around its periphery to generate a composite configuration;

printing the composite configuration;

scanning the printed composite configuration and measuring ink density at the center of the printed composite configuration with a scanner, the scanner providing a measured output to a computer;

generating by the computer statistics for the ink density as a function of the composite configuration; and storing the statistics in the form of a lookup table thereby calibrating the printer.

2. The method as in claim 1 wherein some configurations are considered without imposing a limit on a size of a neighborhood which is taken into account in determining the ink coverage and without having to consider all configurations in the neighborhood.

3. The method according to claim 1 further including the steps of:

reading a halftone image; and using the lookup table to generate a predicted image for the printer.

4. The method according to claim 1 wherein a dithering algorithm is adapted to the printer without introducing a simple geometric model for the shape of the dots.

5. The method according to claim 1 further comprising the step of using a configuration dependent probability distribution of the ink coverage probability distribution of the ink coverage at each pixel to calibrate a printer.

6. The method according to claim 1 wherein the placement of said N dots in the configuration matrix is chosen at random.

7. A system for capturing the characteristics of a printer so as to predict the ink coverage induced by a halftone matrix at each pixel, comprising:

a computer generating a basic configuration matrix and a random number N, the computer combining the configuration matrix with N dots around its periphery to generate a composite configuration;

a printer responsive to the computer for printing the composite configuration;

a scanner measuring ink density at a center of the printed composite configuration and providing a measured output to the computer, the computer generating statistics for the ink density as a function of the composite configuration; and an archive connected to the computer for storing the statistics in the form of a lookup table.

8. The system according to claim 7 wherein the computer combines the N dots around the periphery of the configuration matrix at random.

* * * * *